United States Patent [19]

Fukushima et al.

[11] 4,197,382

[45] Apr. 8, 1980

[54] COMPOSITION FOR COVER RUBBER OF RUBBER PIPES OR HOSES

[75] Inventors: Hiroshi Fukushima, Zushi; Akio Maeda, Yokohama; Masaaki Inagami, Kamakura; Kinro Hashimoto, Yokohama, all of Japan

[73] Assignee: Nippon Zeon Co. Ltd., Tokyo, Japan

[21] Appl. No.: 682

[22] Filed: Jan. 3, 1979

[30] Foreign Application Priority Data

Jan. 6, 1978 [JP] Japan ........................................ 53/441

[51] Int. Cl.$^2$ .............................................. C08G 65/32
[52] U.S. Cl. .................................... 525/403; 528/376; 528/393
[58] Field of Search ........................ 528/376, 393, 404

[56] References Cited

U.S. PATENT DOCUMENTS

| | | | |
|---|---|---|---|
| 3,158,591 | 11/1964 | Vandenberg | 260/88.3 |
| 3,285,893 | 11/1966 | Vandenberg | 260/88.3 |
| 3,728,321 | 4/1973 | Vandenberg | 260/88.3 |
| 3,787,376 | 1/1974 | Nakamura et al. | 260/79 |

*Primary Examiner*—Earl A. Nielsen
*Attorney, Agent, or Firm*—Sherman & Shalloway

[57] ABSTRACT

A rubber composition for use as a cover of rubber pipes or hoses, comprising a terpolymer rubber composed of 35 to 80 mole% of epichlorohydrin, 15 to 50 mole% of ethylene oxide and 5 to 15 mole% of an unsaturated epoxide, and a di- or tri-mercapto-s-triazine as a vulcanization agent.

4 Claims, No Drawings

COMPOSITION FOR COVER RUBBER OF RUBBER PIPES OR HOSES

This invention relates to a rubber composition suitable for the formation of an outer layer, i.e. cover rubber, of a rubber pipe or hose which is a composite consisting of an inner layer and the outer layer.

Various industrial rubber pipes and hoses are designed to convey gases or liquids under positive or negative pressures among different component parts of a vibration system while maintaining them in a sealed condition. They are required therefore to have satisfactory oil resistance, weatherability, thermal stability, flexural resistance, crack resistance, closability, gas permeability, resistance to a reduction in mechanical strength by swelling, and resistance to degradation by a chemical reaction with liquids under service conditions, and also to possess a low permanent compression set so as to secure sealability. For example, various oil-resistant rubber pipes and hoses used in the engine sections of motor vehicles are described in detail in Journal of The Society of Rubber Industry, Japan, 48, 139 (1975). It is known from this publication that many rubber pipes and hoses used in motor vehicles are of a composite structure composed of an inner and an outer layer of different materials.

In recent years, the engine sections of motor vehicles have been improved to meet the legislative requirements of regulating motor exhaust gases for air pollution control. As a result, the ambient atmosphere of the engine sections tends to be at a higher temperature than that of conventional engine sections, and the ambient temperature conditions for rubber parts have become rigorous. The rise of the ambient temperature would result in an increase in permanent compression set in a high temperature environment, and in a decrease in service life owing to accelerated chemical degradation (degradation by oxidation and ozone). The increased permanent compression set reduces the clamping pressures of hose sleeves at high temperature, which in turn causes leakage of gasoline or lubricant oils and may lead to a serious accident. The decrease of the service life, on the other hand, means that the maintenance cycle should be shortened. A great deal of efforts have therefore been made in an attempt to overcome these disadvantages by using new materials for rubber components. In particular, fueling hoses and vacuum hoses used at the engine sections of motor vehicles entail a serious danger of causing fire which may lead to serious accidents resulting in injuries or deaths, and countermeasures are in urgent need.

In the past, chloroprene rubber, nitrile rubber, and fluorocarbon rubber have been used principally as elastomers for oil-resistant rubbery materials. However, since chloroprene essentially has low resistance to gasoline and fluorocarbon rubber is too expensive, the nitrile rubber has gained overwhelming acceptance. The nitrile rubber, however, has the serious defect that it essentially has low weatherability, and extremely poor resistance to cracking by ozone, and easily causes leakage as a result of cracking. Accordingly, most of oil-resistant rubber pipes and hoses now in use are of a composite structure consisting of an inner layer of nitrile rubber and an outer layer (cover rubber) of chlorosulfonated polyethylene or chloroprene rubber having superior thermal stability and resistance to cracking by ozone and moderate oil resistance.

These rubber pipes or hoses are still unsatisfactory when the ambient temperature is high. Those hoses which have a cover of chlorosulfonated polyethylene may possibly slip out of hose sleeves, and those having a cover of chloroprene rubber have the defect that since an antioxidant and an ozone degradation inhibiting agent contained in the rubber are volatilzed or are easily extracted by gasoline or lubricant oils which diffuse from and pass through the inner layer, and the ambient temperature is high, these hoses are likely to have markedly reduced resistance to cracking by ozone and to result in leakage.

A copolymer rubber (to be referred to as CHC) of equimolar proportions of epichlorohydrin and ehylene oxide is a material which those skilled in the art would naturally select as a possible replacement of these cover rubber materials. CHC has recently gained increasing acceptance as an elastomer which simultaneously has thermal stability, gasoline (oil) resistance and cold resistance which are essential to important safety component parts of automobiles. Unfortunately, its resistance to cracking by ozone is not satisfactory, and despite the absence of an unsaturated bond in it, CHC easily undergoes cracking by ozone under severe conditions. Thus, CHC is not a reliable material that can supersede chlorosulfonated polyethylene and chloroprene rubber.

It is an object of this invention therefore to provide a cover rubber having superior resistance to cracking by ozone and a high permanent compression set without sacrificing the thermal stability, gasoline (oil) resistance and cold resistance of CHC.

This object of the invention is achieved by a composition comprising a terpolymer rubber composed of 35 to 80 mole% of epichlorohydrin, 15 to 50 mole% of ethylene oxide and 5 to 15 mole% of an unsaturated epoxide and a di- or trimercapto-s-triazine as a vulcanizing agent.

The characteristic feature of the invention is that an unsaturated epoxide is used as a component of a terpolymer rubber, and a di- or tri-mercapto-s-triazine which does not cause the unsaturated bond of the unsaturated epoxide to participate in the vulcanization reaction is used as a vulcanizer. This can afford a cover rubber which exhibits superior resistance to cracking by ozone and a high permanent compression set.

The terpolymer rubber used in this invention preferably has a Mooney viscosity of 10–150 [$ML_{1+4}$ at 100° C.].

Suitable unsaturated epoxides are allyl glycidyl ether, glycidyl methacrylate, glycidyl acrylate, and butadiene monoxide. If the proportion of the unsaturated epoxide is less than 5 mole %, resistance to cracking by ozone cannot be improved, and if it exceeds 15 mole%, marked degradation by hardening occurs in a hot air atmosphere, and the resulting rubber loses rubbery elasticity and becomes brittle.

The proportion of ehtylene oxide is selected according to cold resistance required of rubber. If the proportion of ehtylene oxide is less than 15 mole%, the cold resistance of the resulting rubber is unsatisfactory. If it exceeds 50 mole%, the rubber swells to an increasing degree in gasoline, and its oil resistance is sacrificed.

The especially preferred proportions of the copolymer components are: 48 to 74 mole% of epichlorohydrin, 20 to 40 mole% of ethylene oxide, and 6 to 12 mole% of the unsaturated epoxide.

Usually, vulcanization of rubber having copolymerized therewith an unsaturated epoxide is effected by utilizing the unsaturated bond of the epoxide, and therefore, sulfur or a sulfur donor is used in the vulcanization of the terpolymer rubber of the invention, the content of the unsaturated bond decreases, the resistance to cracking by ozone cannot be improved, and thermal stability is also impaired. In the present invention, therefore, a sulfurless vulcanizer which causes the unsaturated bond of the unsaturated epoxide to remain in the vulcanized rubber and causes a chlorine atom to participate in the vulcanization reaction must be used. Various such vulcanizers are known as those for saturated epichlorohydrin rubbers. In the present invention, specified di- or trimercapto-s-triazines are used as a vulcanizer, and this can give cover rubbers having a high permanent compression set.

Di- or tri-mercapto-s-triazines of the class disclosed in U.S. Pat. No. 3,787,396 can be used in this invention. Especially preferred are 2-anilino-4,6-dimercapto-s-triazine, 2-(N,N-dibutylamino-4,6-dimercapto-s-triazine, 2,4,6-trimercapto-s-triazine, and sodium salts of these. From the standpoint of storage stability and processing stability, 2,4,6-trimercapto-s-triazine is most preferred. The amount of the vulcanizer in the composition of this invention is not critical, but usually, it is 0.5 to 5.0 parts by weight per 100 parts by weight of the terpolymer rubber.

The rubbery composition of this invention can be prepared by mixing a terpolymer of epichlorohydrin/ethylene oxide/unsaturated epoxide, a di- or tri-mercapto-s-triazine as a vulcanizer, and as optional ingredients, ordinary rubber chemicals such as vulcanization aids, reinforcing agents, filler, plasticizers, antioxidants and activating agents by an ordinary mixing machine such as a rolls or a Banbury mixer. The vulcanization aid may be used usually in an amount of up to 15 parts by weight, preferably 2 to 10 parts by weight, per 100 parts by weight of the terpolymer rubber. Examples of the vulcanization aids are aromatic or aliphatic polybasic acid salts such as alkali metal or alkaline earth metal salts of benzoic acid, phthalic acid, stearic acid, adipic acid or azelaic acid; and inorganic oxides, hydroxides, sulfides, carbonates, phosphates and thio-acid salts of metals selected from elements of Groups I, II and IV of the periodic table, such as oxides of magnesium, calcium, barium or lead, or carbonates of magnesium, calcium or barium.

A rubber tube or hose can be produced from the rubber composition of this invention by an ordinary method, for example by extruding the rubber composition of this invention through an extruder, applying it as an outer layer around a separately prepared oil-resistant rubber tube as an inner layer, and heating the resulting composite. In many cases, fibers are braided between the two layer for reinforcement. The oil-resistant rubber tube as an inner layer can be produced, for example, from nitrile rubber, fluorocarbon rubber, a homopolymer of epichlorohydrin, a copolymer of epichlorohydrin with another epoxide such as ethylene oxide, etc. The resulting rubber pipe or hose has superior resistance to cracking by ozone and a high permanent compression set, and surprisingly, also possess much improved water durability.

The following Examples illustrate the present invention more specifically.

EXAMPLE 1

A terpolymer of epichlorohydrine/ethylene oxide/allyl glycidyl ether prepared by a known solution-polymerization in the presence of an organoaluminum compound-type polymerization catalyst was mixed with other compounding ingredients on cold rolls in accordance with the following compounding recipe. The mixture was heated under pressure at 155° C. for 30 minutes, and then heat-treated at 150° C. for 4 hours to afford a vulcanized product. The properties of the vulcanized product were measured, and the results are shown in Table 1.

The measurement of the properties of the vulcanizates and the preparation of samples were effected in accordance with JIS K-6301. Thermal stability was rated by observing changes in hardness and the occurrence of cracks upon bending by 180°. In an ozone deterioration test, a sample was prepared by dipping the vulcanizate in a JIS test fuel oil C at 40° C. for 48 hours, and drying it in vacuum for a day and a night. The sample was then subjected to an ozone deterioration test which comprises placing the sample in an atmosphere kept at 40° C. and containing ozone in a concentration of 50 pphm, and repeatedly placing sample under dynamic conditions in which an elongation displacement of 0 to 30% (an operation of deforming the sample to a 30% elongated state from the relaxed state, and then returning it to the relaxed state) was given to the test sample once in a second. The state of cracking was rated on the following scale in accordance with JIS K-6301, and recorded by a combination of the rating of the "number of cracks" and the rating of "size and depth of cracks" as "A-4."

Number of cracks
A: Small
B: Many
C: Innumerable

Size and depth of cracks
1: Not perceptible to the naked eye; but could be ascertained by 10× magnifying glass.
2: Could be ascertained by the naked eyed.
3: Cracks were deep and relatively large (less than 1 mm)
4: Cracks were deep and large (at least 1 mm but less than 3 mm)
5: Likely to cause a crack or break having a site at least 3 mm.

| Compounding recipe | Parts by weight |
| --- | --- |
| Terpolymer rubber | 100 |
| Stearic acid | 2 |
| Magnesium oxide | 3 |
| Calcium carbonate | 5 |
| FEF carbon black | 20 |
| SRF carbon black | 60 |
| Dibutylmethylene bisthioglycolate (plasticizer) | 15 |
| 2,4,6-Trimercapto-s-triazine | 1.2 |
| Nickel dibutyldithiocarbamate | 1.0 |
| 2-Mercaptobenzimidazole | 0.5 |

Table 1

| Run No. | 1 | 2 | 3 | 4 | 5 | 6 |
|---|---|---|---|---|---|---|
| | Comparison | | | Invention | | Comparison |
| Terpolymer rubber (mole%) | | | | | | |
| Epichlorohydrin | 50 | 50 | 50 | 50 | 50 | 50 |
| Ethylene oxide | 50 | 47 | 45 | 40 | 35 | 30 |
| Allyl glycidyl ether | — | 3 | 5 | 10 | 15 | 20 |
| Properties in normal condition | | | | | | |
| Tensile strength (kg/cm$^2$) | 101 | 108 | 113 | 104 | 105 | 97 |
| Elongation (%) | 260 | 240 | 200 | 180 | 170 | 140 |
| Hardness (JIS) | 76 | 75 | 74 | 74 | 75 | 76 |
| Ozone deterioration test | | | | | | |
| State of cracking after testing for 24 hours | C-3 | B-1 | No crack formed | | | |
| Heated air aging test | | | | | | |
| After testing at 150° C. for 240 hours, Points at which hardness changed | +5 | +7 | +10 | +12 | +15 | +20 |
| 180° Bending test | | | No crack formed | | | Broken |
| JIS lubricant oil #3 dipping test | | | | | | |
| After testing at 100° C. for 70 hours Change in volume(%) | −0.4 | +0.1 | +0.8 | +1.8 | +2.2 | +4.5 |
| JIS fuel oil B dip test | | | | | | |
| After testing at 40° C. for 48 hours Volume change (%) | +7.3 | +8.5 | +9.6 | +11.2 | +13.0 | +20.4 |
| Impact embrittlement test (°C.) | −43 | −42 | −40 | −41 | −41 | −45 |
| Test of dipping in distilled water | | | | | | |
| After testing at 70° C. for 72 hours, Volume change (%) | +45.6 | +38.2 | +21.8 | +20.6 | +20.1 | +19.0 |

It is seen from the data given in Table 1 that the vulcanizate of the rubber composition of this invention has markedly improved resistance to cracking by ozone without sacrificing the oil-resistance, thermal stability and cold resistance of CHC. It is also seen that if the proportion of allyl glycidyl ether which constitutes the epichlorohydrin/ethylene oxide/allyl glycidyl ether is less than 5 mole%, the ozone cracking resistance of the vulcanizate is not improved, and when it exceeds 15 mole%, the vulcanizate loses rubbery elasticity and is broken in a 180° bending test in a high-temperature atmosphere although it has sufficient resistance to ozone cracking. Surprisingly, the vulcanizate of the rubber composition of this invention has much improved volume change in a test involving dipping in distilled water.

EXAMPLE 2

The same tests as in Example 1 were performed on various epichlorohydrin/ethylene oxide/unsaturated epoxide terpolymer rubbers in which the proportion of the unsaturated epoxide remained almost the same (10 mole%). Cold resistance was evaluated by examining the condition of breakage at −35° C. The results are shown in Table 2.

Table 2

| Run No. | 7 | 8 | 9 | 10 | 11 | 12 |
|---|---|---|---|---|---|---|
| | Comparison | | Invention | | | Comparison |
| Terpolymer rubber composition (mole%) | | | | | | |
| Epichlorohydrin | 35 | 40 | 50 | 60 | 70 | 80 |
| Ethylene oxide | 55 | 50 | 40 | 30 | 20 | 10 |
| Allyl glycidyl ether | 10 | 10 | 10 | 10 | 10 | 10 |
| Impact embrittlement test at −35° C. | | No breakage occurred | | | | Broken |
| Test of dipping in JIS fuel oils | | | | | | |
| After testing at 40° C. for 48 hours Volume change (%) in fuel oil B | +29.5 | +18.3 | +11.2 | +9.6 | +8.6 | +8.2 |
| Volume change (%) | | | | | | |

Table 2-continued

| Run No. | 7 Comparison | 8 Invention | 9 Invention | 10 Invention | 11 Invention | 12 Comparison |
|---|---|---|---|---|---|---|
| in fuel oil C. | +48.8 | +32.3 | +29.1 | +27.3 | +23.7 | +23.5 |

It is seen from the data given in Table 2 that the properties of the terpolymer rubber change with the proportion of ethylene oxide. Specifically, when the amount of ethylene oxide exceeds 50 mole%, the vulcanizate has an extremely poor resistance to fuel oils, and its volume changes remarkably. When it is less than 15 mole%, the cold resistance of the vulcanizate is poor, and its practical applicability is unsatisfactory.

EXAMPLE 3

A rubber composition was prepared in accordance with the compounding recipe of Example 1 except that a terpolymer rubber of epichlorohydrin (65 mole%), ethylene oxide (25 mole%), and allyl glycidyl ether (10 mole%) or CHC ("Hydrin 200," a trademark for a product of B. F. Goodrich Company) was used. The composition was heated under pressure at 160° C. for 60 minutes to form a vulcanizate. Furthermore, a chloroprene rubber composition of the following recipe was prepared and heated under pressure at 160° C. for 60 minutes to afford a vulcanizate having the same hardness as the vulcanizate obtained by the above procedure.

The oil resistances and ozone cracking resistances of the vulcanizates were tested in the same way as in Example 1. Furthermore, these test specimens were heat-aged at 120° C. for 70 hours, and placed in an atmosphere kept at 40° C. and containing ozone in a concentration of 50 pphm while it was stretched 20% (ozone deterioration test under static conditions in accordance with JIS K-6301). The results are shown in Table 3.

| Compounding recipe | Parts by weight |
|---|---|
| Chloroprene rubber* | 100 |
| Stearic acid | 2 |
| Zinc oxide | 3 |
| Magnesium oxide | 5 |
| FEF carbon black | 30 |
| SRF carbon black | 40 |
| Naphthenic process oil | 15 |
| 2-Mercaptoimidazoline | 1.2 |
| Tetramethylthiuram disulfide | 1.0 |
| Paraffin wax | 2.0 |
| N-isopropyl-N'-phenyl-p-phenylene diamine | 2.0 |
| Diallyl p-phenylene-diamine | 2.0 |
| Phenyl β-naphthylamine | 1.0 |

*"Neoprene WRT" a product of Showa Neoprene Company

Table 3

| Run No. | 13 Invention | 14 Comparison (Chloroprene rubber incorporated) | 15 Comparison (CHC incorporated) |
|---|---|---|---|
| Properties in a normal condition | | | |
| Tensile strength (kg/cm²) | 121 | 153 | 118 |
| Elongation (%) | 220 | 340 | 300 |
| Hardness (JIS) | 67 | 65 | 68 |
| Ozone deterioration test | | | |
| After 4 hours | No crack | B-2 | A-1 |
| After 24 hours | No crack | C-4 | A-3 |
| Ozone deterioration test in a static condition after heat deterioration | | | |
| After 72 hours' test | No crack | A-1 | No crack |
| Test of dipping in JIS fuel oil B | | | |
| After testing at 40° C. for 48 hours | | | |
| Volume change (%) | +9.3 | +52.8 | +8.0 |

It is seen from the data given in Table 3 that the vulcanizate of the rubber composition of this invention exhibits far better ozone cracking resistance than the vulcanizates of the chloroprene rubber and CHC compositions and has good oil resistance.

EXAMPLE 4

A rubber composition was prepared by cold rolls in accordance with the following recipe. The composition was heated under pressure at 155° C. for 30 minutes, and heat-treated at 150° C. for 4 hours. The properties of the vulcanizate were measured in accordance with JIS K-6301. The results are shown in Table 4.

| Compounding recipe (Run No. 16) | Parts by weight |
|---|---|
| Terpolymer rubber of epi-chlorohydrin (65 mole%), ethylene oxide (28 mole%) and allyl glycidyl ether (7 mole%) | 100 |
| Stearic acid | 1 |
| FEF carbon black | 40 |
| Nickel dibutyldithio-carbamate | 1 |
| Magnesium oxide | 3 |
| Calcium carbonate | 5 |
| 2,4,6-Trimercapto-s-triazine | 1.2 |

| Compounding recipe (Run No. 17) | Parts by weight |
|---|---|
| Chlorosulfonated polyethylene | 100 |
| FEF carbon balc | 40 |
| Phenyl β-naphthylamine | 2 |
| Litharge | 20 |
| Magnesium carbonate | 20 |
| Dibenzothiazyl disulfide | 0.5 |

Table 4

| Run No. | 16 Invention | 17 Comparison |
|---|---|---|
| Properties in a normal condition | | |
| Tensile strength (kg/cm²) | 122 | 260 |

Table 4-continued

| Run No. | 16 Invention | 17 Comparison |
|---|---|---|
| Elongation (%) | 220 | 280 |
| Hardness (JIS) | 71 | 73 |
| Permanent compression set (%) | | |
| After 100° C. × 70 hours | 13.1 | 29.6 |
| After 135° C. × 70 hours | 26.9 | 89.5 |
| After 150° C. × 70 hours | 48.3 | 100 |
| Test of dipping in JIS fuel oil B | | |
| After testing at 40° C. for 48 hours, Volume change (%) | 22.0 | 68.3 |

It is seen from the data shown in Table 4 that the vulcanizate of the rubber composition of this invention exhibits far better permanent compression set than the vulcanizate of the chlorosulfonated polyethylene composition, and has very good oil resistance.

EXAMPLE 5

A vulcanizate of a composition comprising a terpolymer rubber of epichlorohydrin (65 mole%), ethylene oxide (35 mole%), and allyl glycidyl ether (5 mole%) in accordance with the recipe shown in Table 5 under the same conditions as in Example 1. The properties of the vulcanizate were tested in the same way as in Example 1, and the results are shown in Table 6.

Table 5

| Compounding recipe | | | | |
|---|---|---|---|---|
| Run No. | 18 | 19 | 20 | 21 |
| Terpolymer rubber | 100 | 100 | 100 | 100 |
| Stearic acid | 2 | 2 | 2 | 2 |
| Magnesium oxide | 3 | 5 | — | — |
| Calcium carbonate | 5 | — | — | — |
| Red lead | — | — | 7 | 5 |
| FEF carbon black | 30 | 30 | 30 | 30 |
| SRF carbon black | 40 | 40 | 40 | 40 |
| Di-(butoxyethoxyethyl) adipate | 15 | 15 | 15 | 15 |
| 2,4,6-Trimercapto-s-triazine | 1.2 | — | — | — |
| 2-Anilino-4,6-dimercapto-s-triazine | — | 2.0 | — | — |
| 2-Mercaptoimidazoline | — | — | 1.2 | — |
| Sulfur | — | — | — | 2.0 |
| Dibenzothiazyl disulfide | — | — | — | 1.5 |
| 1,3-Diphenyl guanidine | — | — | — | 0.5 |
| Nickel dibutyldithiocarbamate | 1.0 | 1.0 | 1.0 | 1.0 |
| 2,2,4-Trimethyl-1,2-dihydroquinoline | 0.5 | 0.5 | 0.5 | 0.5 |
| 2-Mercaptobenzimidazole | 0.25 | 0.25 | 0.25 | 0.25 |

Table 6

| Run No. | 18 | 19 | 20 | 21 |
|---|---|---|---|---|
| | Invention | | | Comparison |
| Properties in a normal condition | | | | |
| Tensile strength (kg/cm²) | 118 | 139 | 132 | 125 |
| Elongation (%) | 210 | 300 | 260 | 270 |
| Hardness (JIS) | 73 | 77 | 72 | 75 |
| Ozone deterioration test in a complex dynamic condition | | | | |
| After testing for 24 hours | No crack formed | | | B-1 |
| Hot air deterioration test | | | | |
| After testing at 150° C. for 240 hours | | | | |
| Points at which hardness changed | +10 | +9 | +10 | +19 |
| 180° bending test | No crack formed | | | Broken |
| Permanent compression set (%) | | | | |
| After 100° C. × 72 hours | 11.8 | 12.9 | 18.8 | 26.7 |
| After 120° C. × 72 hours | 22.0 | 19.3 | 39.9 | 51.0 |

It is seen from the data given in Table 6 that the vulcanizates of Runs Nos. 18 to 20 which were formed by the action of di- or tri-mercapto-s-triazine or 2-mercaptoimidazoline on the chlorine atom of epichlorohydrin exhibit superior ozone cracking resistance and thermal stability, whereas the vulcanizate of Run No. 21 formed by the action of sulfur on the unsaturated bond of allyl glycidyl ether is inferior in these properties. It is also seen that the vulcanizates of Runs Nos. 18 and 19 in accordance with this invention formed by using the di- or tri-mercapto-s-triazine had a better permanent compression set than the vulcanizate of comparison (Run No. 20) obtained by using 2-mercaptoimidazoline.

What is claimed is:

1. A rubber composition for use as a cover of rubber pipes or hoses, comprising a terpolymer rubber composed of 35 to 80 mole% of epichlorohydrin, 15 to 50 mole% of ethylene oxide and 5 to 15 mole% of an unsaturated epoxide, and a di- or tri-mercapto-s-triazine as a vulcanization agent.

2. The rubber composition of claim 1 wherein the amount of the vulcanizing agent is 0.5 to 5.0 parts by weight per 100 parts by weight of the terpolymer rubber.

3. The rubber composition of claim 1 wherein the unsaturated epoxide is allyl glycidyl ether, glycidyl methacrylate, glycidyl acrylate or butadiene monoxide.

4. The rubber composition of claim 1 wherein the di- or tri-mercapto-s-triazine is 2-anilino-4,6-dimercapto-s-triazine, 2-(N,N-dibutylamino)-4,6-dimercapto-s-triazine, 2,4,6-trimercapto-s-triazine, or a sodium salt of any of these.

* * * * *